US011010429B2

(12) United States Patent
Martino et al.

(10) Patent No.: US 11,010,429 B2
(45) Date of Patent: May 18, 2021

(54) DYNAMIC SOCIAL NETWORK RELATIONSHIP DETERMINATION METHOD AND APPARATUS

(71) Applicant: Microsoft Technology Licensing, LLC, Redmond, WA (US)

(72) Inventors: Paul J. Martino, Mountain View, CA (US); Chris Vale, San Francisco, CA (US); Kristopher C. Wehner, Oakland, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1885 days.

(21) Appl. No.: 14/506,116

(22) Filed: Oct. 3, 2014

(65) Prior Publication Data
US 2015/0026211 A1 Jan. 22, 2015

Related U.S. Application Data

(63) Continuation of application No. 14/470,458, filed on Aug. 27, 2014, now abandoned, which is a (Continued)

(51) Int. Cl.
*G06F 16/903* (2019.01)
*G06F 16/907* (2019.01)
(Continued)

(52) U.S. Cl.
CPC ...... *G06F 16/90335* (2019.01); *G06F 16/907* (2019.01); *G06F 16/9024* (2019.01);
(Continued)

(58) Field of Classification Search
CPC ............. G06F 16/90335; G06F 16/907; G06F 16/958; G06F 16/9024; H04L 67/306; H04L 67/10; G06Q 50/01
See application file for complete search history.

(56) References Cited

U.S. PATENT DOCUMENTS 6,112,181 A 8/2000 Shear et al.
6,134,566 A 10/2000 Berman et al.
(Continued)

FOREIGN PATENT DOCUMENTS

EP 1288795 A1 3/2003

OTHER PUBLICATIONS

"U.S. Appl. No. 11/102,570, Applicant Initiated Interview Summary dated Aug. 16, 2011", 3 pgs.
(Continued)

*Primary Examiner* — Mehmet Yesildag
*Assistant Examiner* — Shaun D Sensenig
(74) *Attorney, Agent, or Firm* — Schwegman Lundberg & Woessner, P.A.

(57) ABSTRACT

A method for a computer system includes receiving an identifier from a user, initiating a user session in response to the identifier, determining a social map for the user in response to the identifier and in response to a plurality of social network relationships, receiving a first change to the plurality of social network relationships from the user, receiving a second change to the plurality of network relationships from another user, determining a revised social map for the user during the user session in response to receiving the first change, but not in response to receiving the second change, wherein the revised social map for the user reflects the first change and the second change, and storing the revised social map for the user during the user session in a cache.

20 Claims, 8 Drawing Sheets

Related U.S. Application Data continuation of application No. 11/123,854, filed on May 6, 2005, now abandoned.

(60) Provisional application No. 60/570,911, filed on May 12, 2004.

(51) Int. Cl.
*G06F 16/958* (2019.01)
*G06F 16/901* (2019.01)
*H04L 29/08* (2006.01)
*G06Q 50/00* (2012.01)

(52) U.S. Cl.
CPC .......... *G06F 16/958* (2019.01); *G06Q 50/01* (2013.01); *H04L 67/10* (2013.01); *H04L 67/306* (2013.01)

(56) References Cited

U.S. PATENT DOCUMENTS

| | | | |
|---|---|---|---|
| 6,175,831 B1 | 1/2001 | Weinreich et al. | |
| 6,275,819 B1 * | 8/2001 | Carter | G06F 16/24539 |
| 6,285,997 B1 * | 9/2001 | Carey | G06F 16/24539 |
| 6,295,526 B1 * | 9/2001 | Kreiner | G06F 17/30321 |
| | | | 707/741 |
| 6,405,035 B1 | 6/2002 | Singh et al. | |
| 6,505,197 B1 | 1/2003 | Sundaresan et al. | |
| 6,622,147 B1 | 9/2003 | Smiga et al. | |
| 6,745,196 B1 | 6/2004 | Colyer et al. | |
| 6,868,389 B1 | 3/2005 | Wilkins et al. | |
| 7,069,308 B2 | 6/2006 | Abrams | |
| 7,096,308 B2 | 8/2006 | Main et al. | |
| 7,113,917 B2 | 9/2006 | Jacobi et al. | |
| 7,167,910 B2 | 1/2007 | Farnham et al. | |
| 7,177,880 B2 | 2/2007 | Ruvolo et al. | |
| 7,191,170 B2 * | 3/2007 | Ganguly | G06F 16/24539 |
| | | | 707/741 |
| 7,275,102 B2 | 9/2007 | Yeager et al. | |
| 7,289,965 B1 | 10/2007 | Bradley et al. | |
| 7,318,037 B2 | 1/2008 | Solari | |
| 7,539,697 B1 | 5/2009 | Akella | |
| 7,818,394 B1 | 10/2010 | Lawler et al. | |
| 7,831,684 B1 | 11/2010 | Lawler et al. | |
| 7,856,449 B1 | 12/2010 | Martino et al. | |
| 7,860,889 B1 | 12/2010 | Martino et al. | |
| 8,010,619 B1 | 8/2011 | Lawler et al. | |
| 8,375,097 B2 | 2/2013 | Lawler et al. | |
| 8,682,995 B1 | 3/2014 | Lawler et al. | |
| 2001/0014868 A1 | 8/2001 | Herz et al. | |
| 2002/0071546 A1 | 6/2002 | Brennan et al. | |
| 2002/0126140 A1 | 9/2002 | Gorbet et al. | |
| 2002/0138289 A1 | 9/2002 | Thielges et al. | |
| 2002/0178161 A1 | 11/2002 | Brezin et al. | |
| 2003/0028596 A1 | 2/2003 | Toyota | |
| 2003/0046097 A1 | 3/2003 | Lasalle et al. | |
| 2003/0050977 A1 | 3/2003 | Puthenkulam et al. | |
| 2003/0158855 A1 | 8/2003 | Farnham et al. | |
| 2003/0167324 A1 | 9/2003 | Farnham et al. | |
| 2003/0200112 A1 | 10/2003 | Royall, Jr. et al. | |
| 2003/0216986 A1 | 11/2003 | Hassan | |
| 2004/0148275 A1 * | 7/2004 | Achlioptas | G06F 17/30867 |
| 2004/0167794 A1 | 8/2004 | Shostack et al. | |
| 2005/0021750 A1 | 1/2005 | Abrams | |
| 2005/0076241 A1 * | 4/2005 | Appelman | H04L 51/12 |
| | | | 726/4 |
| 2005/0131884 A1 | 6/2005 | Gross et al. | |
| 2005/0149622 A1 | 7/2005 | Kirkland | |
| 2005/0210008 A1 | 9/2005 | Tran et al. | |
| 2005/0210102 A1 | 9/2005 | Johnson et al. | |
| 2005/0246420 A1 | 11/2005 | Little | |
| 2005/0256866 A1 | 11/2005 | Lu et al. | |
| 2006/0167864 A1 | 7/2006 | Bailey et al. | |
| 2007/0088614 A1 | 4/2007 | Huo | |
| 2011/0040844 A1 | 2/2011 | Lawler et al. | |
| 2014/0372385 A1 | 12/2014 | Martino et al. | |
| 2015/0026210 A1 | 1/2015 | Martino et al. | |

OTHER PUBLICATIONS

"U.S. Appl. No. 11/102,570, Final Office Action dated Feb. 5, 2013", 17 pgs.

"U.S. Appl. No. 11/102,570, Final Office Action dated Feb. 9, 2010", 20 pgs.

"U.S. Appl. No. 11/102,570, Final Office Action dated Mar. 15, 2011", p pgs.

"U.S. Appl. No. 11/102,570, Non Final Office Action dated Jun. 26, 2012", 14 pgs.

"U.S. Appl. No. 11/102,570, Non Final Office Action dated Jul. 3, 2008", 14 pgs.

"U.S. Appl. No. 11/102,570, Non Final Office Action dated Aug. 19, 2010", 19 pgs.

"U.S. Appl. No. 11/102,570, Notice of Allowance dated Aug. 21, 2013", 10 pgs.

"U.S. Appl. No. 11/102,570, Response filed Apr. 3, 2009 to Final Office Action dated Jan. 5, 2009", 14 pgs.

"U.S. Appl. No. 11/102,570, Response filed May 10, 2010 to Final Office Action dated Feb. 9, 2011", 16 pgs.

"U.S. Appl. No. 11/102,570, Response filed Jul. 30, 2013 to Final Office Action dated Feb. 5, 2013", 10 pgs.

"U.S. Appl. No. 11/102,570, Response filed Aug. 12, 2011 to Final Office Action dated Mar. 15, 2011", 12 pgs.

"U.S. Appl. No. 11/102,570, Response filed Sep. 4, 2009 to Non Final Office Action dated Jun. 8, 2009", 16 pgs.

"U.S. Appl. No. 11/102,570, Response filed Oct. 3, 2008 to Non Final Office Action dated Jul. 3, 2008", 15 pgs.

"U.S. Appl. No. 11/102,570, Response filed Oct. 25, 2012 to Non Final Office Action dated Jun. 26, 2012", 8 pgs.

"U.S. Appl. No. 11/102,570, Response filed Dec. 20, 2010 to Non Final Office Action dated Aug. 19, 2010", 8 pgs.

"U.S. Appl. No. 11/102.570, Final Office Action dated Jan. 5, 2009", 17 pgs.

"U.S. Appl. No. 11/123,854, Examiner Interview Summary dated Jul. 28, 2016", 3 pgs.

"U.S. Appl. No. 11/123,854, Non Final Office Action dated Apr. 15, 2016", 21 pgs.

"U.S. Appl. No. 11/123,854, Notice of Non-Compliant Amendment dated Jul. 30, 2015".

"U.S. Appl. No. 11/123,854, Office Action dated May 7, 2010", 2 pgs.

"U.S. Appl. No. 11/123,854, Preliminary Amendment filed 08-", 14 pgs.

"U.S. Appl. No. 11/123,854, Response filed Jan. 29, 2016 to Notice of Non-Compliant Amendment dated Jul. 30, 2015", 10 pgs.

"U.S. Appl. No. 11/123,854, Response filed Feb. 1, 2010 to Final Office Action dated Nov. 2, 2009", 14 pgs.

"U.S. Appl. No. 11/123,854, Response filed Mar. 18, 2011 to Non Final Office Action dated Dec. 9, 2010", 14 pgs.

"U.S. Appl. No. 11/123,854, Response filed May 17, 2010 to Non Final Office Action dated May 7, 2010", 14 pgs.

"U.S. Appl. No. 11/123,854, Response filed Jun. 22, 2009 to Non Final Office Action dated Mar. 25, 2009", 14 pgs.

"U.S. Appl. No. 11/123,854, Response filed Nov. 9, 2011 to Final Office Action dated Jun. 10, 2011", 9 pgs.

"U.S. Appl. No. 11/221,573, Examiner Interview Summary dated Jul. 28, 2016", 3 pgs.

"U.S. Appl. No. 11/221,573, Non Final Office Action dated Apr. 13, 2016", 18 pgs.

"U.S. Appl. No. 11/221,573, Notice of Non-Compliant Amendment dated Aug. 21, 2015", 6 pgs.

"U.S. Appl. No. 11/221,573, Response filed Jan. 21, 2016 to Notice of Non-Compliant Amendment dated Aug. 21, 2015", 8 pgs.

"U.S. Appl. No. 11/221,573 Response filed Apr. 25, 2011 to Non Final Office Action dated Jan. 25, 2011", 11 pgs.

"U.S. Appl. No. 11/221,573, Response filed Jul. 15, 2010 to Non Final Office Action dated Apr. 15, 2010", 14 pgs.

(56) References Cited

OTHER PUBLICATIONS

"U.S. Appl. No. 11/221,573, Response filed Nov. 16, 2011 to Final Office Action dated Jul. 21, 2011", 9 pgs.
"U.S. Appl. No. 11/221,573, Response filed Dec. 21, 2010 to Final Office Action dated Sep. 23, 2010", 13 pgs.
"U.S. Appl. No. 11/221,573 Response filed Dec. 23, 2009 to Non Final Office Action dated Sep. 30, 2009", 15 pgs.
"Application Serial No. Non Final Office Action dated Jun. 8, 2009", 18 pgs.
Brian, Lawler, et al., "Methods and Apparatus for Targeting communications Using Social network Metrics", U.S. Appl. No. 11/123,852, filed Apr. 7, 2005, 91 pgs.
Lawler, Brian, et al., "Social Network Augmentation of Search Results Methods and Apparatus", U.S. Appl. No. 11/222,685, filed Sep. 8, 2005, 42 pgs.
Lawler, Brian, et al., "Social Network Filtering of Search Results Methods and Apparatus", U.S. Appl. No. 11/223,452, filed Sep. 8, 2005, 38 pgs.
Martino, Paul, et al., "Dynamic Social Network Relationship Determination Methods and Apparatus", U.S. Appl. No. 11/221,573, filed Sep. 7, 2005, 42 pgs.
Martino, Paul, et al., "Methods and Apparatus for Determining Social Relevance in Near Constant Time", U.S. Appl. No. 11/123,853, filed May 5, 2005, 38 pgs.
Martino, Paul, et al., "Methods and Apparatus for Redetermining Social Maps Upon Expectation of Change", U.S. Appl. No. 11/123,844, filed May 6, 2005, 37 pgs.
"U.S. Appl. No. 11/123,854, Examiner Interview Summary dated Mar. 25, 2011", 4 pgs.
"U.S. Appl. No. 11/123,854, Examiner Interview Summary dated Aug. 18, 2010", 3 pgs.
"U.S. Appl. No. 11/123,854, Examiner Interview Summary dated Aug. 23, 2010", 3 pgs.
"U.S. Appl. No. 11/123,854, Examiner Interview Summary dated Nov. 16, 2011", 3 pgs.
"U.S. Appl. No. 11/123,854, Final Office Action dated Jun. 10, 2011", 12 pgs.
"U.S. Appl. No. 11/123,854, Final Office Action dated Nov. 2, 2009", 13 pgs.
"U.S. Appl. No. 11/123,854, Non Final Office Action dated Dec. 9, 2010", 15 pgs.
"U.S. Appl. No. 11/221,573, Examiner Interview Summary dated Dec. 27, 2010", 4 pgs.
"U.S. Appl. No. 11/221,573, Final Office Action dated Jul. 21, 2011", 18 pgs.
"U.S. Appl. No. 11/221,573, Final Office Action dated Sep. 23, 2010", 21 pgs.
"U.S. Appl. No. 11/221,573, Non Final Office Action dated Jan. 25, 2011", 17 pgs.
"U.S. Appl. No. 11/221,573, Non Final Office Action dated Apr. 15, 2010", 22 pgs.
"U.S. Appl. No. 11/221,573, Non Final Office Action dated Sep. 30, 2009", 88 pgs.
"U.S. Appl. No. 14/506,154, Preliminary Amendment filed Oct. 8, 2014", 7 pgs.
"U.S. Appl. No. 11/123,854, Non Final Office Action dated Mar. 25, 2009", 12 pgs.
"Secure Business Intelligence with Brio Enterprise", Meeting user's need for flexible data access, while providing robust security with Brio Enterprise 5.5, Brio Technology, [Online]. Retrieved from the Internet: <http://www.gtech.com.tr/Kutuphane/Secure_Business_Intelligence_with_Brio_Enterprises.pdf>, (Nov. 1998), 20 pgs.
Balabanovic, et al., "Content-Based, Collaborative Recommendation", ACM, vol. 40, No. 3, (Mar. 1997), 66-72.
Fahl, Gustov, et al., "Query processing over object views of relational data", The VLDB Journal 6, (1997), 261-281.
Kautz, et al., "Combining Social Networks and Collaborative Filtering", vol. 40, No. 3, (Mar. 1997), 63-65.
Lawler, Brian, et al., "Communication Systems and Methods with Social Network Filtering", U.S. Appl. No. 12/913,197, filed Oct. 27, 2010, 59 pgs.
Lawler, Brian, et al., "Communication Systems and Methods with Social Network Filtering", U.S. Appl. No. 11/102,569, filed Apr. 7, 2005, 43 pgs.
Lawler, Brian, et al., "Methods and Apparatus for Integrating Social Network Metrics and Reputation Data", U.S. Appl. No. 11/102,573, filed Apr. 7, 2005, 38 pgs.
Lawler, Brian, et al., "Methods and Apparatus for Integrating Social Network Metrics and Reputation Data", U.S. Appl. No. 13/110,302, filed May 18, 2011, 57 pgs.
Lawler, Brian, et al., "Social Network Augmentation of Search Results Methods and Apparatus", U.S. Appl. No. 11/222,685, filed Sep. 8, 2005, 45 pgs.
Lawler, Brian, et al., "Social Network Filtering of Search Results Methods and Apparatus", U.S. Appl. No. 11/223,452, filed Sep. 8, 2005, 45 pgs.
Martino, Paul J, et al., "Dynamic Social Network Relationship Determination Method and Apparatus", U.S. Appl. No. 11/123,854, filed May 6, 2005, 43 pgs.
Martino, Paul, et al., "Hierarchical Posting Systems and Methods With Social Network Filtering", U.S. Appl. No. 11/102,572, filed Apr. 7, 2005, 63 pgs.
Martino, Paul J, et al., "Methods and Apparatus for Determining Social Relevance in Near Constant Time", U.S. Appl. No. 11/123,853, filed May 5, 2005, 41 pgs.
Martino, Paul J, "Methods and Apparatus for Redetermining Social Maps Upon Expectation of Change", U.S. Appl. No. 11/123,844, filed May 6, 2005, 40 pgs.
Martino, Paul, et al., "Restricting Hierarchical Posts With Social Network Metrics Methods and Apparatus", U.S. Appl. No. 11/102,565, filed Apr. 7, 2005, 43 pgs.
Schafer, et al., "Recommender systems in E-Commerce", ACM, Proceedings of the 1st ACM conference on Electronic Commerce, (1999), 158-166.
"U.S. Appl. No. 14/470,458, Non Final Office Action dated Oct. 12, 2017", 15 pgs.
"U.S. Appl. No. 14/506,154, Non Final Office Action dated Oct. 11, 2017", 12 pgs.
"Non Final Office Action Issued in U.S. Appl. No. 14/470,458", dated Jan. 18, 2019, 26 Pages.
"Non Final Office Action Issued in U.S. Appl. No. 14/506,154", dated Jan. 11, 2019, 21 Pages.

* cited by examiner

DYNAMIC SOCIAL NETWORK RELATIONSHIP DETERMINATION METHOD AND APPARATUS

CROSS REFERENCE TO RELATED APPLICATIONS

The present invention is a continuation of U.S. patent application Ser. No. 14/470,458, filed Aug. 27, 2014, which claims priority to U.S. patent application Ser. No. 11/123,854, filed May 6, 2005, which claims the benefit of priority of Provisional Application No. 60/570,911, filed May 12, 2004, which applications are incorporated herein by reference in their entirety. The present invention also incorporates by reference for all purposes in its entirety application Ser. No. 11/102,570, filed Apr. 7, 2005.

BACKGROUND OF THE INVENTION

The present invention relates to social networks. More specifically, the present invention relates to methods and apparatus for providing high-performance relationship reporting between users in a social network.

Conventional methods for determining the relationships between a user and other users in a network of users have included the use of a relational database to store, determine and provide the relationships.

The primary difficulty with such approaches is the exponential growth of size of a social network. For example, if a first user knows "n" (e.g. 100) second users on the social network, and each of the "n" (e.g. 100) second users knows "n" (e.g. 100) unique third users, etc., the first user may have $n^2$ (e.g. $100^2=1,000$) users in their social network that are within two "degrees of separation" away. Additionally, the first user may have $n^3$ (e.g. $100^3=100,000$) users in their social network that are within three "degrees of separation" away. Accordingly, when a social network has a large number of users, the number of computations required to determine a social map increases dramatically (e.g. exponentially). As a result, performing social network calculations on large social networks cannot be done in real-time, as such a system would take too long to compute whenever there is a change in the social network.

The inventors of the present invention believe that relational databases alone are not well-suited to perform social network calculations because of this exponential growth in size of a user's social map when a small number of first degree (direct) relationships are added to the whole social network.

One attempt to address this exponential computation growth has been to perform such computations at night time, at off-peak hours, or other specified batch time. The computations of users' social map would then be stored in memory for use at a later time, until the next batch time. Between computations, the cached computation data would then provided to the user when requested. Drawbacks to this approach included that when the user requested their social map, the user network, the user would be provided with a copy of the data previously cached at batch time. Further, any changes initiated by the user before the next batch process, would not be visible until the next batch time. Additional drawbacks included that caching the relationship data for a large number of users would be prohibitively hardware expensive.

In light of the above, what is required are improved methods and apparatus that address the issues above.

BRIEF SUMMARY OF THE INVENTION

The present invention relates to methods and apparatus for dynamically determining relationships in a social network. In various embodiments, determination of these relationships are typically performed in real time. In some embodiments of the present invention, the relationships are determined for a user when the user logs into the social network, accordingly, the relationship data are virtually always up-to-date.

Additional embodiments of the present invention determine the relationship data more efficiently and quickly than using conventional methods. Further, other embodiments allow users to query and receive relationship data between a user and a target user dynamically. In embodiments of the present invention, relationship data for a user is computed at user log-in time and cached. Accordingly, the social map of the user is virtually up-to-date each user session. Additionally, in various embodiments, one or more "dirty" bits may indicate whether the cached copy of the social map is stale and should be recomputed or not. In various embodiments the relationship data for a user may be recomputed and cached during a particular session, typically when the user has an expectation of a change. For example, if the user modifies her relationships with another user, or the like, the user would expect that modification to be reflected in her relationship data. In other embodiments, the relationships data for a user can be performed on demand, and in real-time.

According to one aspect of the invention, a method for a computer system including a server, a database, and a graphing server is disclosed. One technique includes storing a plurality of social network relationships in the graphing server, receiving a social relationship query associated with a first user in the server, wherein the social relationship query includes a social network query portion and a database query portion, and determining a social network indicia associated with the first user in the server in response to the plurality of social network relationships stored in the graphing server. Other processes may include determining whether the social network indicia exceeds a threshold social network indicia in the server, and when the social network indicia exceeds the threshold social network indicia, the method includes sending the database query portion to the database, receiving a database response from the database in response to the database query portion, determining a social network response in response to the social network query portion, combining the social network response and the database response to form a social relationship query response, and outputting the social relationship query response from the server. Methods may also include, when the social network indicia does not exceed the threshold social network indicia, the method includes, sending the social relationship query to the database, receiving a social relationship query in the server from the database in response to the social relationship query, and outputting the social relationship query response from the server.

According to another aspect of the invention, a computer system is described. One apparatus includes a server configured to receive a social relationship query associated with a first user, wherein the server is configured to receive a social network indicia associated with the first user, wherein the server is configured to determine whether the social indicia associated with the first user exceeds a threshold social indicia, and wherein the server is configured to output a social relationship query response to the social relationship query, wherein the social relationship query includes a social network query portion and a database query portion. Another device includes a graphing server coupled to the server, wherein the server is configured to store a plurality of social network relationships, wherein the graphing server is also configured to determine a social network indicia associated with the first user in response to the plurality of social network relationships, and wherein the graphing server is also configured to provide the social network indicia associated with the first user to the server. Another unit includes a database coupled to the server, wherein the database is configured to store the plurality of social network relationships, wherein the database is configured to determine a database query response in response to the database query portion, and wherein the database is configured to determine the social relationship query response in response to the social relationship query. In various embodiments, when the social indicia exceeds the threshold social indicia, the server is configured to provide the database query portion to the database, the server is also configured to receive the database query response from the database, and the server is configured to determine the social relationship query response in response to the social network query portion and in response to the database query response. In other embodiments, when the social indicia does not exceed the threshold social indicia, the server is configured to provide the social relationship query to the database, and the server is configured to receive the social relationship query response from the database.

According to yet another aspect of the invention, a computer program product for a computer system including a processor, wherein the computer system is coupled to a database server and to a graphing server, is described. The computer program product may include code that directs the processor to determine a social relationship query associated with a first user, wherein the social relationship query includes a social network query portion and a database query portion, code that directs the processor to receive a social network indicia associated with the first user determined in the graphing server in response to a plurality of social network relationships, and code that directs the processor to determine whether the social indicia associated with the first user exceeds a threshold social indicia. The computer program product may also include code that directs the processor to provide the database query portion to the database when the social indicia associated with the first user exceeds the threshold social indicia, code that directs the processor to receive a database query response from the database in response to the database query portion when the social indicia associated with the first user exceeds the threshold social indicia, and code that directs the processor to determine a social relationship query response in response to the database query response when the social indicia associated with the first user exceeds the threshold social indicia. Various computer program product also include code that directs the processor to provide the social relationship query to the database when the social indicia associated with the first user does not exceed the threshold social indicia, code that directs the processor to receive the social relationship query response from the database in response to the social relationship query when the social indicia associated with the first user does not exceed the threshold social indicia, and code that directs the processor to output the social relationship query response. The computer program product may reside on a tangible storage media, such as a semiconductor media, optical media, magnetic media, organic media, or the like.

BRIEF DESCRIPTION OF THE DRAWINGS

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings in which.

DETAILED DESCRIPTION OF THE INVENTION

Figure 1:
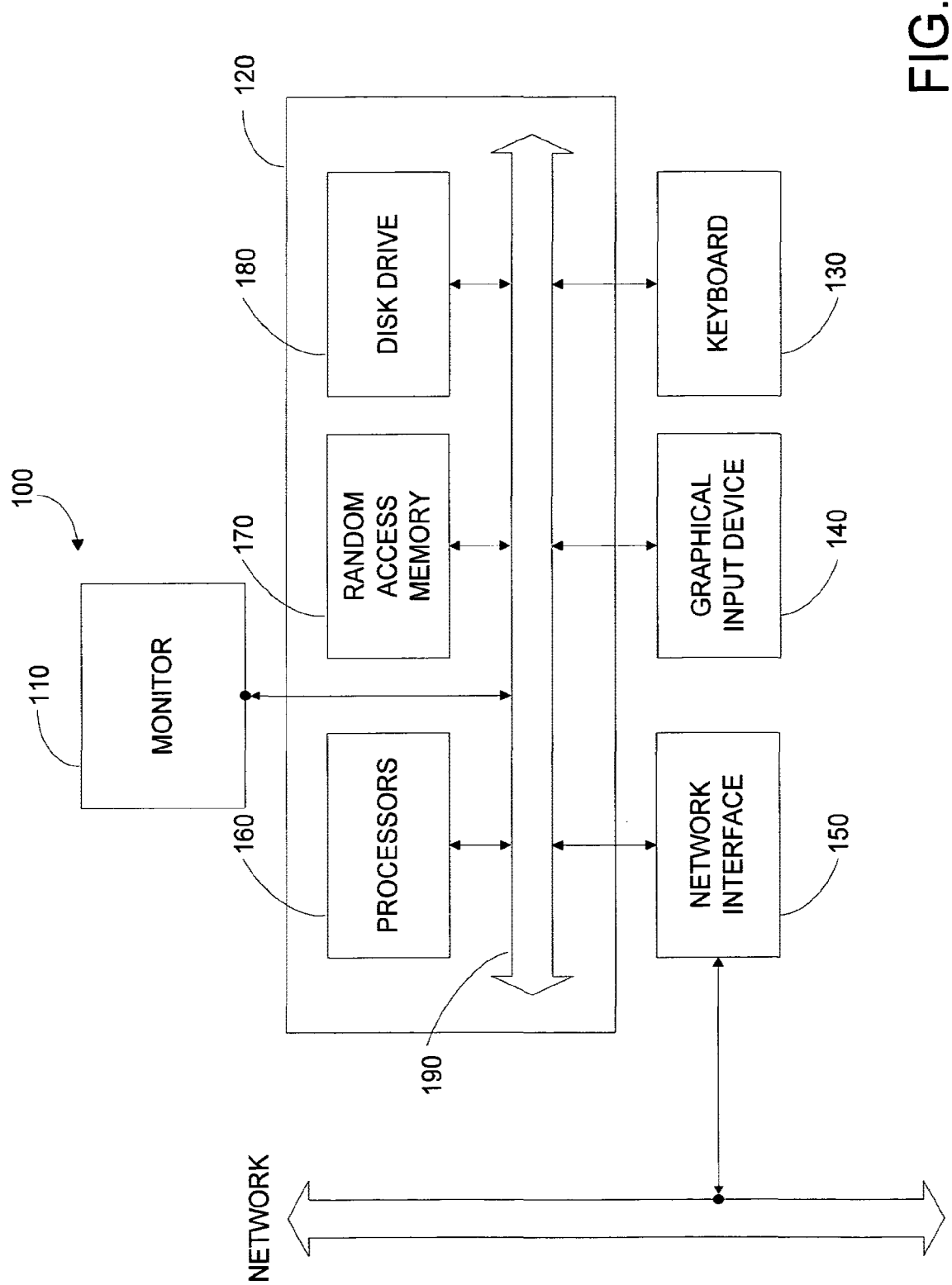
FIG. 1 is a block diagram of typical computer system according to an embodiment of the present invention.

The following definitions are used in the present application:

Degrees of Social Separation—A value defined as immediate friends (or acquaintances) of a user being a first degree; friends of the user's immediate friends being a second degree; etc. Degrees of Social Separation may also refer to affinity groups, with members of the same affinity group being a first degree; members of directly related affinity groups being a second degree; etc. Degrees of social separation may also refer to a combination of ties between friends and ties between members of affinity groups. In various embodiments, degree of social separation between different users may be different depending upon which of the above separation distances are used, and based upon the context in which the degree is to be used.

In various embodiments, the degree of social separation between different users may be different depending upon which metric for separation distances are used, and depending upon the context in which the separation distance is to be used. Additionally, users may have different social separations for different user profiles. For example, two users may have a large social separation when considering personal profiles, but a small social separation when considering membership profiles in affinity groups.

Social distance—A numeric value associated with the Degrees of Social Separation between a first user and a second user. In embodiments of the present invention, a smaller social distance between users represents a higher "trust" level between the users. For example, in many cases, a user will trust her immediate friends (social distance=1); however, a user will trust a friend of her immediate friend (social distance=2) to a smaller degree; and a user will trust a friend of a friend of her immediate friend (social distance=3) even less; and so on. In various embodiments, social distance need not be an integral value and may be a floating point number, for example social distance=4.2, social distance=1.5, etc. In such embodiments, other weighting factors other than mere degree of social separation are considered, such as "importance" of the relationships between the users, the frequency of communications between the users, the frequency and/or quality of business relationship between the users, and the like. Other types of "fuzzy" weighting factors may include frequency of communication between users, common posts to similar forums, and the like.

In embodiments of the present invention, social distance may be symmetric or asymmetric. As an example of this, a social distance between user A and user B may be the same (e.g. 1.4), when both user A and user B value their relationship the same. However, if user A values the relationship more than user B, the social distance from user B to user A may be smaller (e.g. 1.3) than from user A to user B (e.g. 1.8). Some of the factors described above may be used to determine weighting of the relationships, including user satisfaction of a transaction, responsiveness to correspondences or queries, performance, common interests, common posting forum, and the like. In various embodiments, a link weight may be affected by the symmetry or asymmetry of the links between participants. As an example, a bi-directional link may be or more value if both parties have confirmed the relationship. In embodiments of the present invention, the social distance between two users may be computed in real time.

In various embodiments, the relationship weighting factors may be manually determined by the user. For example, user A rates a concluded transaction between user A and user B; user B rates the timeliness of user A payment speed; and the like. In alternative embodiments, the relationship weighting factors may automatically be determined. For example, the frequency of communications between users may indicate a more valued relationship between the users, accordingly, the social distance between users may be shortened. In other examples, the more frequently two users post messages to an affinity group forum or post messages on the same thread in the forum, the higher their weighting factor relative to each other. In such embodiments automatically increasing weighting factors between the users is useful because it infers that users have shared interests. Other types of inferences based on user behavior are contemplated in other embodiments.

In other embodiments, users can decrease their social distance to other users by their own actions. Actions may include quickly responding to e-mail messages, or other communications are replied-to, responsiveness weighting factor of a user may be increased; as another example, frequency of checking e-mail messages or logging into the social network, or the like. As an example, if a user runs a business in the social network, by increasing her quality of service, and client satisfaction, her reputation factor may increase. Accordingly, social distances computed to users coupled to the business in the social network may automatically decrease, because of her increased reputation. As another example, establishing a two-way confirmed link is another example. In various embodiments, two-way link confirmation may use techniques taught in U.S. Pat. No. 6,175,831.

Tribe—An affinity group. One example is similar to a Usenet group, having a user moderator, user participants, discussion forums, etc; whereas in other examples, an affinity group need not have a moderator, leader, or the like. In embodiments of the present invention, two users may be connected in the social network by being members of the same affinity group, even though the two users may otherwise have a large social distance between them.

In various embodiments of the present invention, Tribe membership may be explicitly defined or implicitly defined. Accordingly, Implied Tribes may be determined. These tribes are groupings of users based on a common interest, common activity, or any other type of trait held by two or more users, without an explicit definition. Examples of implied tribes may include users who list a common interest, such as "skiing," users who view a particular classified listing, restaurant review, or the like.

In some embodiments of the present invention, members of affinity groups or groups of users are logically organized as one user (super node). In such embodiments, relationships of members are collapsed and imputed to the affinity group. For example, a clique of three close friends may be considered a super node, for sake of simplicity when performing relationship computations. The relationships of the super node may include the relationships of its underlying users. For example, a ski Utah affinity group may have users A, B, and C, thus the ski Utah affinity group super node will have the affinity relationships of its users A, B, and C. Accordingly, affinity groups can have social distances from other affinity groups. In another example, the ski Utah affinity group will combine the personal relationships of its users A, B, and C. In various embodiments, for this example, the ski Utah affinity group will list both the ski Utah affinity group relationships and the ski Utah affinity group personal relationships side-by-side. These relationships may be represented by a graph, or as desired. In other embodiments, the relationships of the affinity group are expanded and imputed back to the members of the affinity group.

Tribe Mapping—A process of determining a bottom-up taxonomy for related tribes based on common user membership overlap. These maps may be computed based upon explicit tribe membership data, or implicit tribe membership, as described above. For example, if 75% of the users in a bird-watching tribe also view communications on spotting scopes, a tribe mapping may closely associate the bird-watching tribe with an implied spotting-scope tribe. As another example, a "San Francisco Wine Drinker" tribe will most likely have a significant overlap with a "San Francisco" tribe, and a "Wine Drinker" tribe. This mapping can be performed automatically through algorithms that compute similarity, or manually by moderators of the tribes, who explicitly state their relationship. Additionally, determining a Tribe Map may be performed on demand. Accordingly, overlap of affinity groups may be explicit or implicit. The relationship between tribes can then be used as part of a social network filter or affinity filter criteria, described further below.

User Network—A subset of all users on the social network. In embodiments of the present invention, a User Network may be socially limited to a specified social distance from the user and/or by affinity groups which the user is a member of. For example, a user network may include all users within a social distance (or affinity distance) of 3.5. A user network may also be termed a "social network" for the user or a "social map" for the user.

In other embodiments, the user network may constrain the type of information available to the user. As examples, users may be constrained to searching for information (e.g. job posts) from users only within their user network; users may be limited to sending e-mails or invitations, or chatting only with other users in their user network. Many other restrictions can be envisioned to be placed on users based upon their relationships in the social network.

In various embodiments, users may explicitly state that certain users, groups of users, and the like are detrimental and should not be included in the user network. For example, an individual may wish to exclude their membership in a drug-abuse counseling group, from the individual's other friends. In such embodiments, the system 100, described below, treats such nodes as "stop nodes." Accordingly, when system 100 computes the user network, when these nodes are encountered, no link is returned and no further social distance computations are performed. This can be used inductively to also exclude other links to such nodes (e.g. other members of the drug-abuse counseling group.

Social Map—A map of connections from one specific user to other users on the system. It can be collection of User Networks at various relevance thresholds such as 1, 2, 3, 4 and typically includes a shortest path between two users, either via friendship, affinity group, or the like. In some embodiments, a social map for a user is typically socially limited to a specified social distance from the user. In embodiments of the present invention, the limited distance may be specified by an administrator, the user, or the like.

Social Network—A network of relationships between users (via friendship, affinity, or the like).

People Web—A unified collection of social networks into a complete social map. Unifying identities across social networks allows one to traverse the social map in a way similar to DNS for network traffic.

FIG. 1 is a block diagram of typical computer system 100 according to an embodiment of the present invention.

In the present embodiment, computer system 100 typically includes a monitor 110, computer 120, a keyboard 130, a user input device 140, a network interface 150, and the like.

In the present embodiment, user input device 140 is typically embodied as a computer mouse, a trackball, a track pad, wireless remote, and the like. User input device 140 typically allows a user to select objects, icons, text and the like that appear on the monitor 110.

Embodiments of network interface 150 typically include an Ethernet card, a modem (telephone, satellite, cable, ISDN), (asynchronous) digital subscriber line (DSL) unit, and the like. Network interface 150 are typically coupled to a computer network as shown. In other embodiments, network interface 150 may be physically integrated on the motherboard of computer 120, may be a software program, such as soft DSL, or the like.

Computer 120 typically includes familiar computer components such as a processor 160, and memory storage devices, such as a random access memory (RAM) 170, disk drives 180, and system bus 190 interconnecting the above components.

In one embodiment, computer 120 is a PC compatible computer having one or more microprocessors from Intel Corporation, or the like. Further, in the present embodiment, computer 120 typically includes a UNIX-based operating system.

RAM 170 and disk drive 180 are examples of tangible media for storage of data, audio/video files, computer programs, user profile card data, user social network-related data, social distance computation programs, hierarchal posting data, social network filtering criteria, other embodiments of the present invention and the like. Other types of tangible media include magnetic storage media such as floppy disks, hard disks, removable hard disks; optical storage media such as CD-ROMS, DVDs, bar codes, holographic; semiconductor memories such as flash memories, read-only-memories (ROMS), volatile memories; networked storage devices; and the like.

In the present embodiment, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

FIG. 1 is representative of computer rendering systems capable of embodying the present invention. It will be readily apparent to one of ordinary skill in the art that many other hardware and software configurations are suitable for use with the present invention. For example, the use of other micro processors are contemplated, such as PentiumIV™ or Itanium™ microprocessors; AthlonXP™ microprocessors from Advanced Micro Devices, Inc; PowerPC G4™, G5™ microprocessors from Motorola, Inc.; and the like. Further, other types of operating systems are contemplated, such as Windows® operating systems (e.g. WindowsXP®, WindowsNT®, or the like) from Microsoft Corporation, Solaris from Sun Microsystems, LINUX, UNIX, MAC OS from Apple Computer Corporation, and the like.

Figure 2:
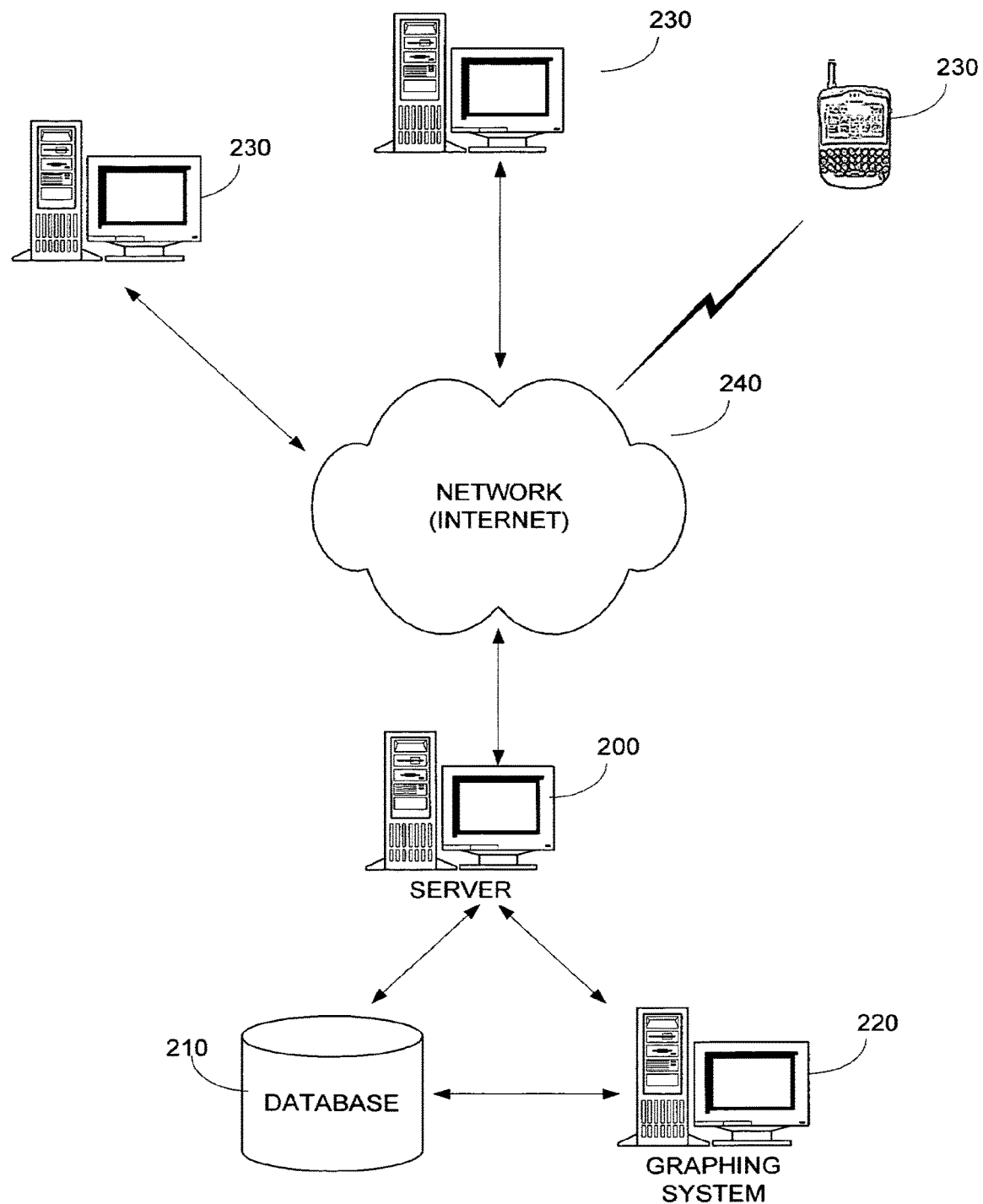
FIG. 2 illustrates a block diagram according to an embodiment of the present invention.

FIG. 2 illustrates another block diagram according to an embodiment of the present invention. FIG. 2 includes a server 200 coupled to a database 210 and coupled to a graphing system 220. A plurality of users 230 are coupled to server 200 via a network 240, such as the Internet.

In the present embodiments, users 230 may be any conventional access device, such as a computer, a web-enabled telephone, a personal digital assistant, or the like. In operation, users 230 log into server 200 and then makes one or more requests for data. The data that is returned is typically displayed back to user.

In various embodiments, server 200 may be embodied, as described above, and include one or more application servers (e.g. server cluster) that respond to requests from users 230. For example, server 200 may be an web server. Additionally, multiple servers may be used in embodiments where server performance is important, e.g. East Coast server for client requests from Boston, Midwest server for client requests from Chicago, and the like. Server 200 may be configured as illustrated in FIG. 1, above.

Database 210 may be any conventional database such as powered by MySQL, Oracle, Sybase, or the like. In other embodiments, database 210 may be any other data source such as an LDAP server, or the like. In the present embodiment, database 210 is configured to store and maintain user data, to store and maintain relationship data between the users, and configured to make changes to relationship data between users, among other functions. As illustrated, database 210 may be coupled to server 200 and to graphing system 220 to send and receive respective data, as will be described below.

In various embodiments, graphing system 220 is a stand-alone computer system configured to receive data from server 200, and configured to store and maintain relationship data between the users. Additionally, in various embodiments, graphing system 220 is configured to determine and provide requested relationship data to server 200. In various embodiments, graphing system 220 may be integrated as a part of server 200, or the like.

In various embodiments, graphing system 220 may be a conventional computer system, as described above. In one embodiment, graphing system 220 maintains in the relationship data of users (including adjacency information and/or associated weights) in RAM. In other embodiments of the present invention, graphing system 220 may store a portion of the relationship data of users in RAM. The other portions of the relationship data of users may be stored on magnetic disk or other media, on database 210, or the like. In such embodiments, elements of the relationship data of users can be loaded into a most recently used (MRU) queue.

In the present embodiment, graphing system 220 computes social relationships in real time by minimizing lookup time of required information. For example, lookup operations such as: who are the direct friends of person A?, who are the members of tribe B?, what is the social map for person A, what is the shortest social distance between person A and person B, what are the shortest paths between person A and person B, what is the shortest path between person A and person B, etc, are preformed in constant or near constant time. In additional embodiments, graphing system 220 may determined updated social maps for a user when the user adds a link to another user, deletes a link to another user, confirms an addition or deletion of a link to another user, and the like. In various embodiments, graphing system 220 stores relationship data for users in RAM in a way that allows explicit control over memory allocation. In some embodiments of the present invention, it is expected that graphing system 220 will be able to compute social distance computations on a social network of up to 20 million users, within 20 milliseconds or less. In other embodiments, it is expected that graphing system 220 will be able to compute a user's social map across a social network of 10 million users within 20 milliseconds and/or will be able to determine all shortest paths between two users on a similar sized network also within a similar amount of time, e.g. 20 milliseconds.

In embodiments of the present invention, graphing system 220 may include a number (e.g. cluster) of individual systems. In various embodiments, the individual systems may store unique portions of the relationship data of users; the individual systems may store in parallel the same portions (or the entire) relationship data of users; or the like. Any traditional data clustering technique may be used to implement graphing system 220 in embodiments of the present invention.

Additionally, in embodiments, graphing system 220 determines the specific relationships (e.g. social distance queries) primarily in RAM. With such a configuration, the performance of graphing system 220 has proven superior than disk-based computation systems such as conventional databases.

In various embodiments, graphing system 220 includes four software components including two C++ components, and two Java components. In other embodiments, other architectures are envisioned. The C++ components includes a portion that solves social distance queries using the RAM, utilizing a memory efficient graph implementation, as will be discussed below. Additionally, the C++ components includes a daemon process that reads commands and write results to a socket (or other transport medium). By having graphing system 220 respond to relationship queries via a socket, different implementations of the server interface, may be easily used, without touching the C++ components.

In various embodiments, the server interface, i.e. java components, includes a java class that provides APIs to requesting servers, such as server 200. The API's serve as the interface layer to the C++ components. Additionally, the java components includes an interface layer that sends requests to the socket and waits for relationship data on the socket. Since this communication is performed via a socket, any language that supports HTTP can be used. Furthermore, the communication need not be HTTP (or IP) based. In various embodiments, other protocols may be used, such as COM, RCP, REST, SOAP, or the like, which may or may not use the IP layer.

In implementation, graphing system 220 may be multi-threaded and thus can support simultaneous requests from server 200. Additionally, in cases where server 200 includes one or more servers for increasing scale, standard clustering techniques such as data replication can be used to support simultaneous requests from one or more servers. Locks and/or semaphores can be used to enable multi-threaded access to the data, without clients waiting for update of the respective data.

In various embodiments, many different types of relationship data can be determined by database 210 and graphing system 220 including, a shortest path between user A and user B (e.g. SOCIAL_DISTANCE (A,B)), typically a floating point value reflecting the distance from user A to B; shortest paths between user A and user B, for example through user C and user D, or through user E and user F (returned as an array of paths); what users are within or less than N degrees from user A (less than a N social distance); who is the most connected user in the social network, and the like. Many other types of information are reportable within other embodiments of the present invention. In embodiments of the present invention, database 210 and graphing system 220 may communicate with each other via custom function calls from database 210.

The relationship determined may be filtered and sorted in any number of conventional ways based upon various parameters. Additionally, database 210 and graphing system 220 are enabled to received up-dated relationship data, such as adding a new user/friendship relationship or removing a friendship relationship, and to recompute the relationship data, and the like.

Figure 3:
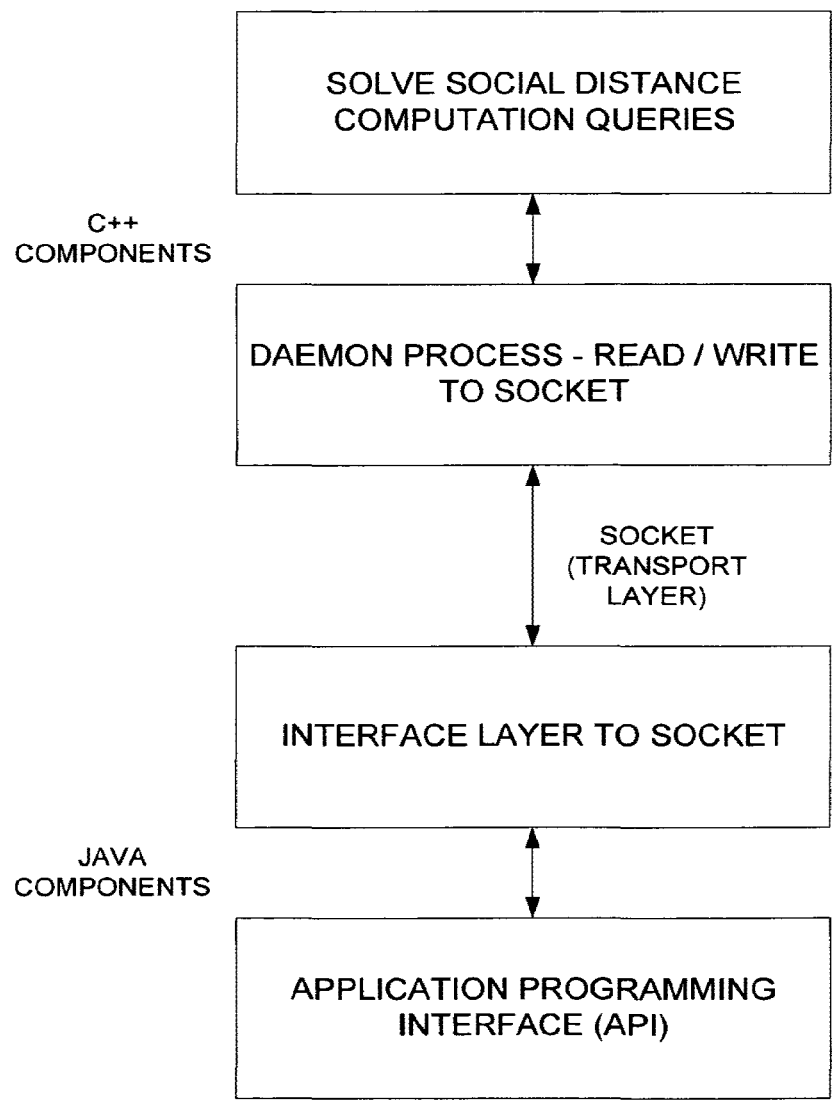
FIG. 3 illustrates another block diagram according to an embodiment of the present invention.

FIG. 3 illustrates an embodiment of the present invention. Specifically, FIG. 3 illustrates functions provided by one embodiment of the present invention.

In one embodiment, each user has an associated (e.g. 32-bit) bit vector or array representing other users connected to the user, i.e. other users at a social distance of one. Additionally, in various embodiments, the bit vector may be stored in either a sparse or dense representation scheme. The density of bit vector is computing by comparing the number of bits in the on state vs. the size of the entire vector. When a sufficient number are on the dense representation is preferred to the sparse. The inventors of the present invention believe such a representation scheme is memory efficient. For example, in a case where 10 million users are each connected to one hundred users, the memory requirement to store first degree social relationships for all users is only about 8 gigabytes. This direct, or first-degree, social network distance can easily fit within RAM of graphing system 220 and can be stored in database 210.

Figure 4A:
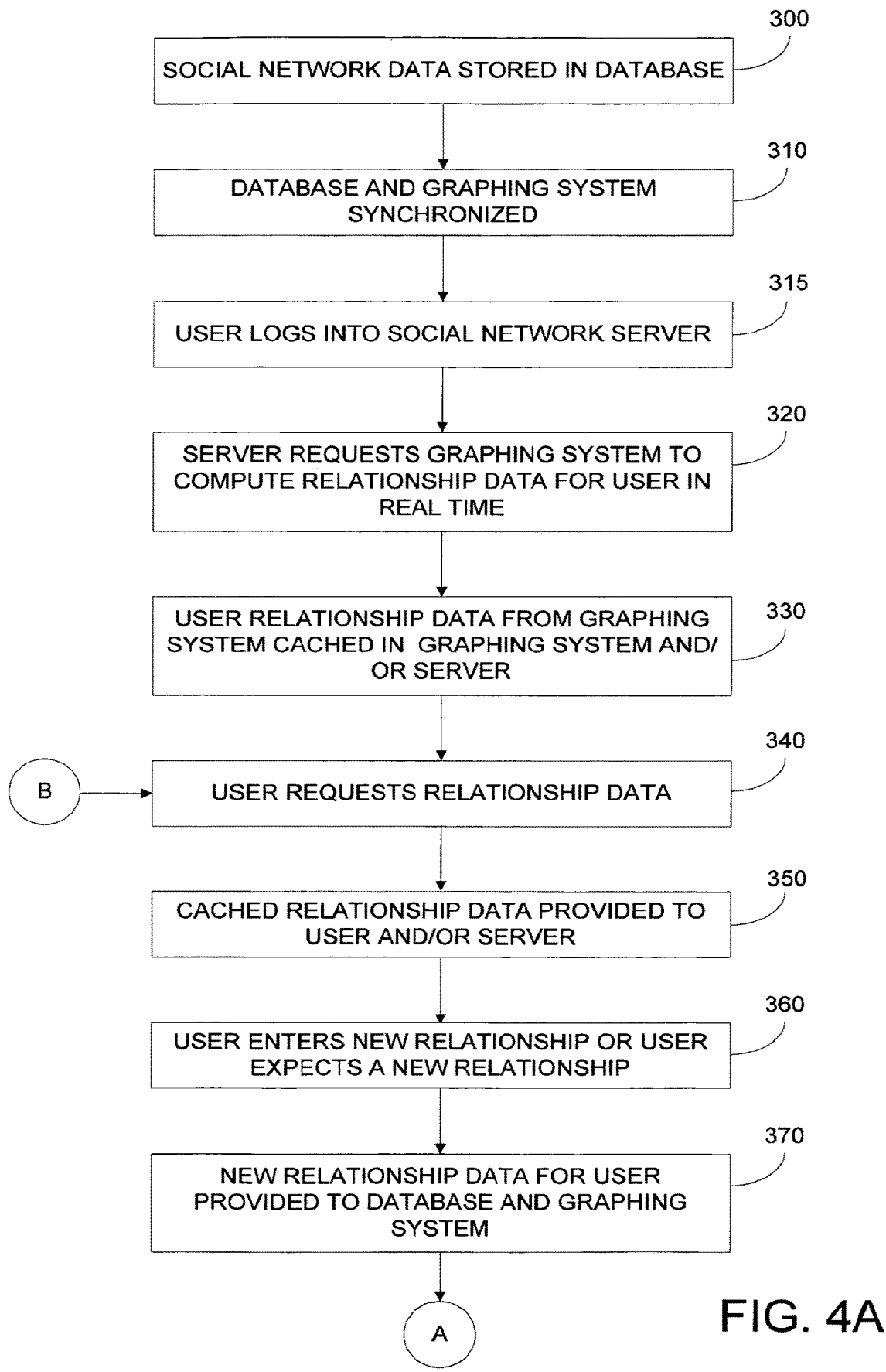
FIGS. 4A-B illustrate a block diagram of an embodiment of the present invention.
Figure 4B:
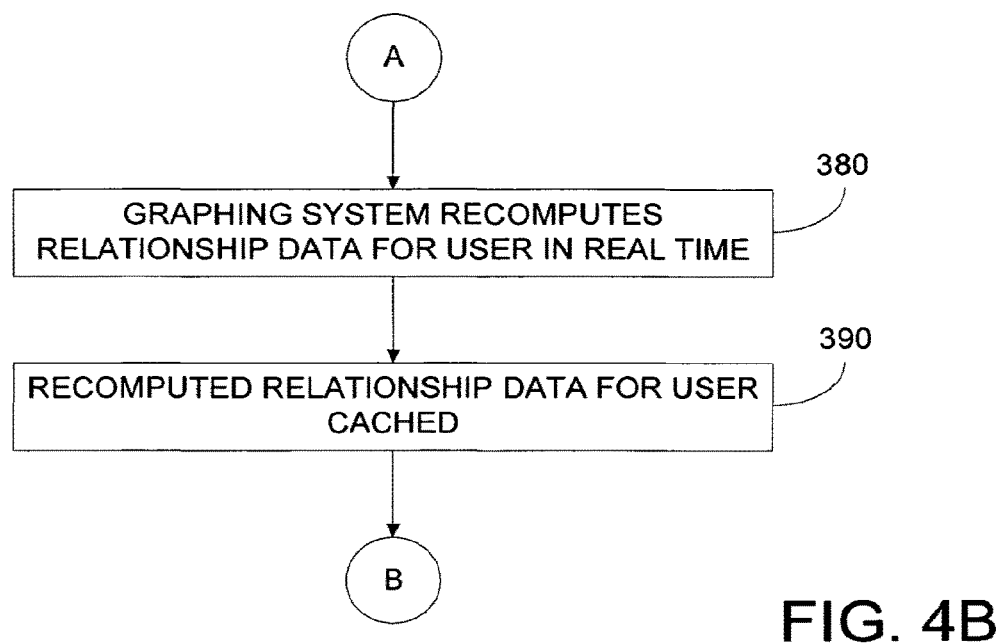

FIGS. 4A-B illustrate a flow diagram according to an embodiment of the present invention.

Initially, user relationship data is stored in database 210, step 300. Next, graphing system 220 is initiated and portions of the relationship data between users is copied to graphing system 220 memory, step 310. As described above, the user data is typically stored in graphing system 220 RAM.

In various embodiments, graphing system 220 does not "touch" database 210 again after receiving the relationship data between users. In other embodiments, graphing system 220 may synchronize its data with database 210 periodically, for example, once a week, every midnight, every 1000th user, or the like. In other embodiments, synchronization may occur only in cases of error recovery such as when the entire graph exceeds the amount of available RAM, or the like. In which case, paging of the most recently used data can be performed.

Later, a user interfaces with server 200 and logs in using any conventional method, step 315. In response to the user logging in, web server 200 requests graphing system 220 to determine user relationship data for the user, step 320. In various embodiments, the types of operations automatically requested includes determining users within a predetermined number of degrees from the user or within a predetermined social distance away from the user, and the like.

In some embodiments, the relationship data is a collection of masking (filtering) bit vectors across all other users on the system. The bit vectors may be returned for a requested social distance, for example, the relationship data for a user may include a collection of bit vectors in which a bit is on if the corresponding user is within 1.5, 3, or 4 degrees of social separation away or less. This vector can be stored in a sparse or dense representation depending on which approach is most storage or time efficient.

In response, graphing system 220 performs the relationship computations, and returns the relationship data to server 200. In various embodiments, graphing server 220 caches the relationship data in RAM, step 330. In this embodiment, as this operation is performed at user log-in time, the data represents a view of the social map of the user at log-in time.

In FIGS. 4A-B, the user subsequently requests to view their social map, or initiates a query for data drawn from the social network, step 340, and receives the copy from server 200, step 350. The social map need not be provided to the user immediately at log-in, but may be provided when requested by the user, after the user logs-in. In embodiments of the present invention, because the relationship data is computed and cached at log-in time, the user typically receives a response to their request from server 200 very quickly. Accordingly, the user experience is believed to be superior to other systems relying upon real-time database querying and wait-for-response.

In other embodiments of the present invention, the social map of the user may be computed in real-time in response to a user's request. The caching of the relationship data for the user at log-in time and retrieval of the cached data is therefore merely an design choice. As described below, because users' often expect data to be static during their session, caching of the data maintains their expectations.

In still other embodiments, alternative to steps 240 and 250 may be performed. For example, in some cases, the user may submit a query that requires data from both database 210 and from graphing system 220 to be combined. In other cases, a social distance calculation can be embedded in the database itself (using a linkable binary such as a dll, or the like). Such embodiments will be discussed further below.

In the present embodiment, during the user session, the user may enter a new relationship, step 360. The new relationship may include, adding a friend, joining an affinity group, conducting a transaction with another user, rating another user, deleting a friend, quitting an affinity group, and the like. In response, server 200 sends a copy of the new relationship to database 210 and to graphing system 220, step 370. The relationship data is used to update data in database 210 and to update the relationship data stored in RAM in graphing system 220. In other embodiments, the new relationship may be daisy-chained from server 200 to graphing system 220, then from graphing system 220 to database 210; or from server to database 210, then from database 210 to graphing system 220.

In various embodiments, as shown above, modifications to the user data is typically passed to both database 210 and to graphing system 220. Accordingly, the data respectively stored in each system should theoretically both be up to date. In some cases, graphing system 220 may periodically synchronize its data with database 210 to ensure graphing system 220 is up-to-date. In some embodiments, it is contemplated that synchronization is only needed for error recovery purposes. For error recovery purposes, in some embodiments, the data should not be out of synchronization by design. In addition, a trigger could be used such that the database notifies the graph system directly, instead of the application notifying both the database and the graph system.

In the present embodiment, in response to the new relationship, graphing system 220 recomputes a new social map for the user, step 380. The new social map may be cached in RAM of graphing system 220 and/or application server 200, step 390. The new social map may also be provided to the user.

In various embodiments of the present invention, it is contemplated that many other users may make relationship changes that may or may not directly affect a user's social map. Accordingly, the inventors have determined that it is desirable that a user's relationships, social map, and the like are not recomputed during a user session unless the user requests a change, as in step 360, or when the user expects a change. In that way, the user's social map will be "stable" during a user session. When the user makes a relationship change, as describe above, the user expects that change to affect their social network. Alternatively, when the user is made aware of a relationship being added from a third party to the user, the user expects that change to show up and affect their social network, for example, if a user confirms a relationship proposed by another user, if the user confirms a deleted relationship proposed by another user, or the like. Accordingly, when the user has that expectation of a change, the social network is recomputed or updated, as described in step 380, above. Because of the real time nature of embodiments of this system, the social map presented to a user can change throughout the user session.

In embodiments of the present invention, when the user logs-out, the cached relationship data for the user may be marked as delete-able from graphing server 220 and/or application server 200 step 390. In other embodiments, time-out conditions or other conditions may also be used to delete or invalidate the cached social map from the memory of graphing system 220 and/or server 200.

FIGS. 5A-D illustrate flow diagrams according to additional embodiments of the present invention. In particular, FIGS. 5A-D illustrate embodiments when a user submits a query that requires data from both database 210 (a database query) and graphing system 220 (a social distance computation), in contrast to steps 340 and 350, above. A typical example is a request for all users within 25 miles (database query) that are within a specified social distance (social distance computation).

Figure 5A:
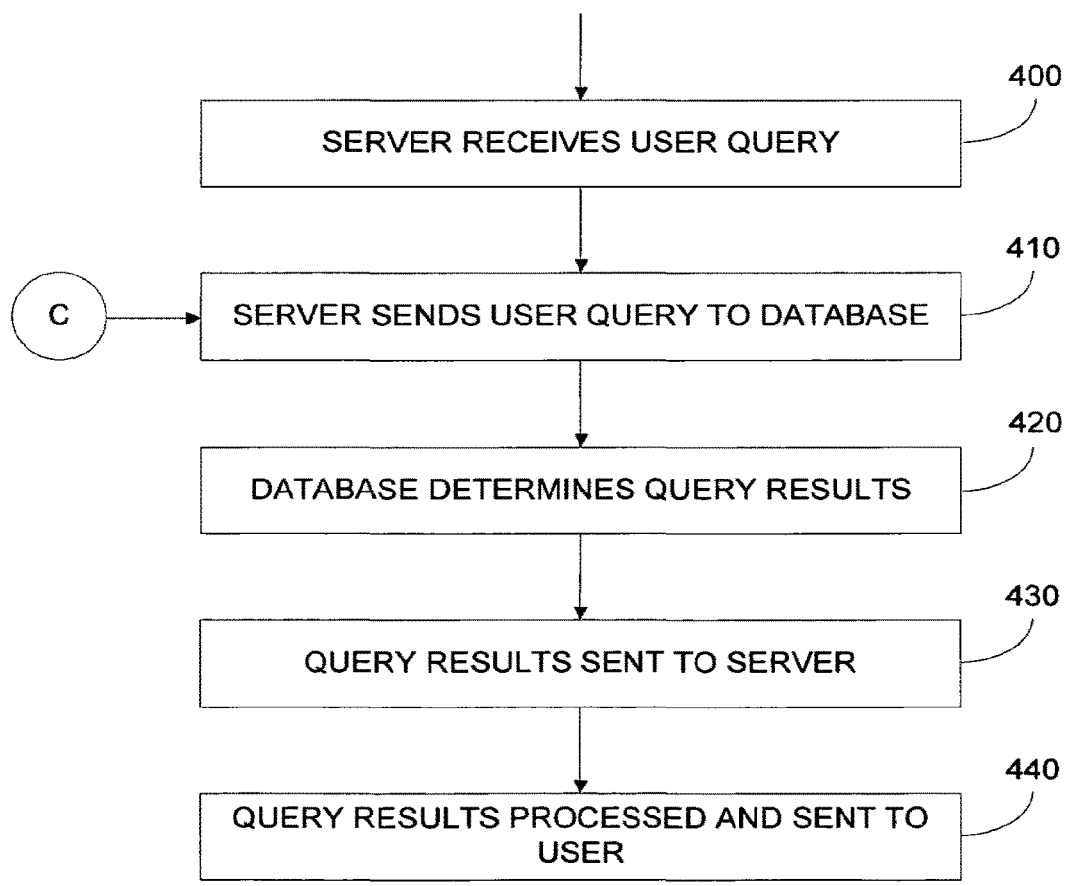
FIGS. 5A-D illustrate another block diagram of an embodiment of the present invention.

In the embodiment in FIG. 5A, the user sends the query to server 200, step 400. Next, server 200 sends the query to database 210 for processing, step 410. In turn, database 210 processes the entire query, step 420, returns the combined query result to server 200, step 430, and server 200 provides the results to the user, step 440. In operation, this embodiment provides sufficient performance when the data set is small. In other words, when a user has a low number of relationships, database 210 can perform the social distance calculation within an acceptable amount of time.

Figure 5B:
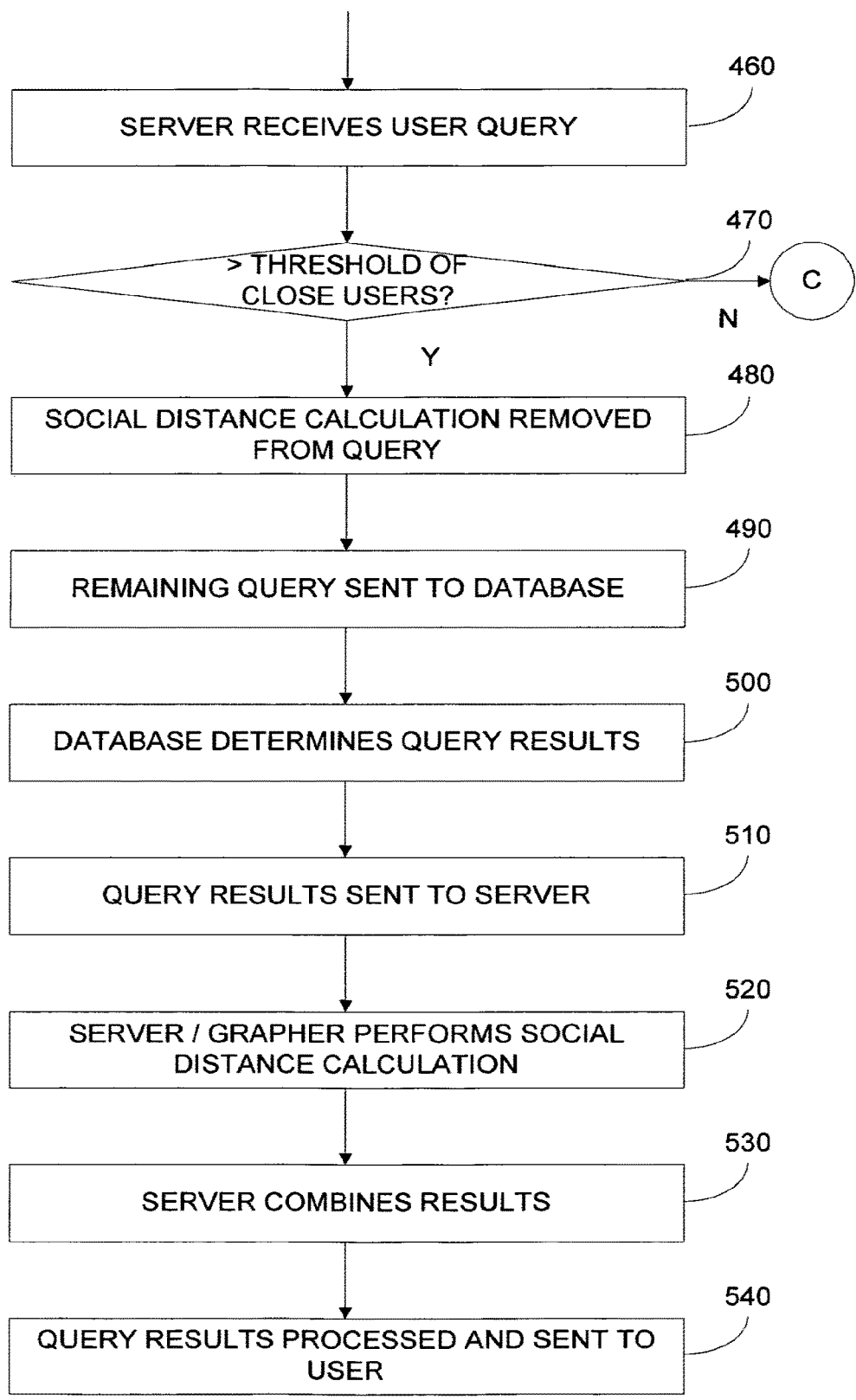

In the embodiment in FIG. 5B, the user sends the query to server 200, step 460. In response, server 200 determines from the cached data whether the user has greater than a threshold number of "close" users, step 470. For instance, server 200 may determine whether the user has less than 1000 users within a predetermined distance away. In other embodiments, the threshold number of users may vary depending upon design considerations. Other thresholds include if the user belongs to a certain number of affinity groups or tribes (both implied or explicit). In other embodiments, combinations of thresholds may be used, for example, a determination in step 470 may be if the number of users directly connected to the user is less than 100 and the number of tribes the user belongs to is less than 10. Many other such examples are contemplated by the inventors.

In the present embodiment, if the number of "close" users is above a threshold, server 200 removes the social distance calculation from the query, step 480, and sends the remaining database query to database 210, step 490. Next, database 210 processes the database query, step 500, and returns the database query result to server 200, step 510.

In this embodiment, at approximately the same time, or afterwards, server 200 performs the social distance computation requested by the user by the query, step 520. In various embodiments, sever 200 may request graphing server 220 to perform the computation, or server 200 may perform the calculation based upon the previously cached data.

Finally, server 200 combines the social distance computation results and the query results, step 530, and provides the combined results to the user, step 540. Using the example above, in this embodiment, database 210 computes all users that are within 25 miles of the user; and server 200 or graphing system 220 determines the users that are within the specified social distance. With this example, server 200 then performs an intersection function on both of the results to determine the users that are within 25 miles of the user and within the specified social distance. Of course other combinations can be performed depending upon the requested query. For example, the user may request a list of all users with 2 miles and a list of all users within a specified social distance regardless of distance. In such a case the function would be a union function.

In this embodiment, if the number of "close" users is below the threshold, server 200 may send the entire query to database 210, as disclosed in FIG. 4A, above.

Figure 5C:
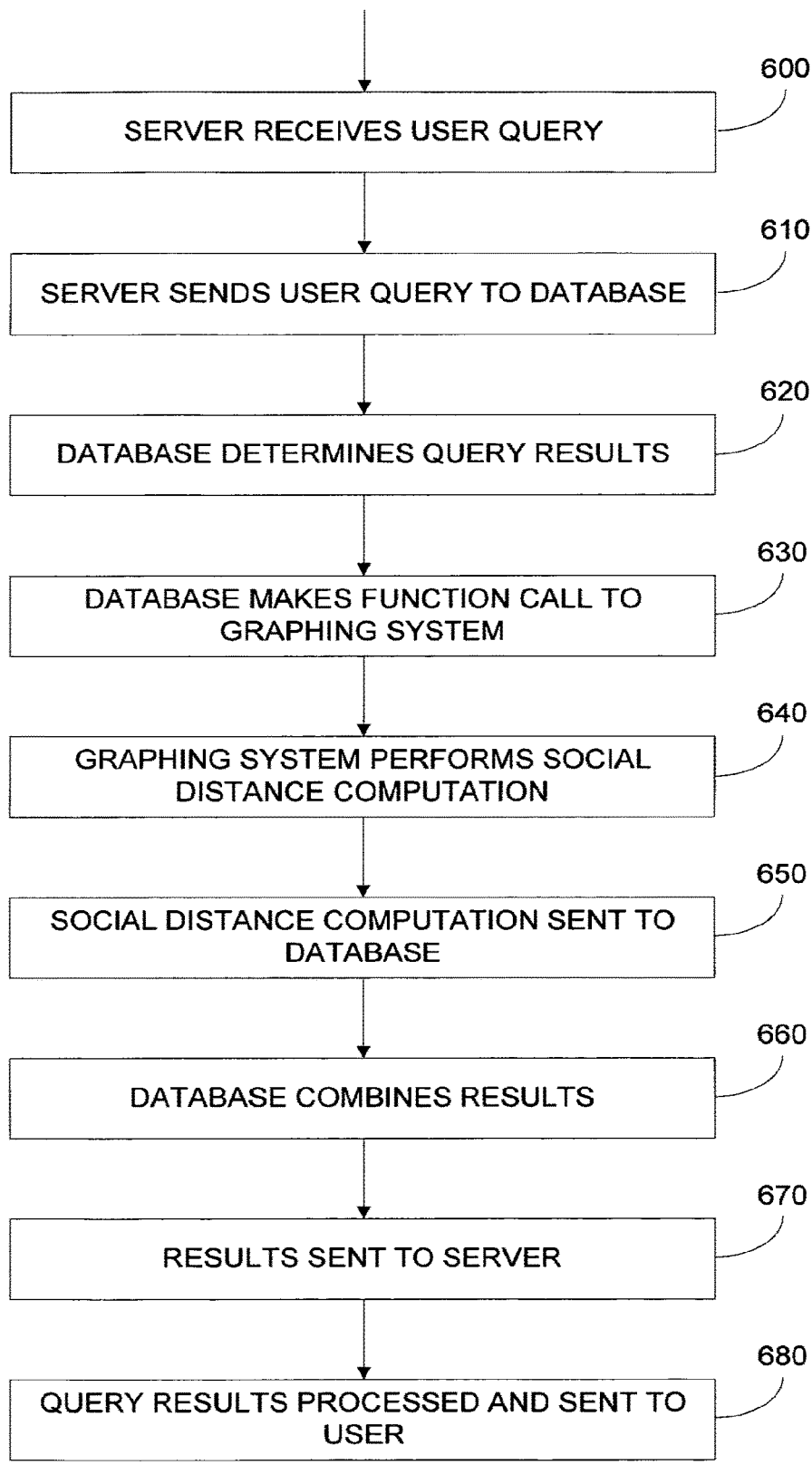

In the embodiment in FIG. 5C, the user sends the query to server 200, step 600. In various embodiments, a thresholding test, such as step 470, may be performed. In some embodiments, if the thresholds are not exceeded, database 210 performs the query by itself, as illustrated in steps 410-440.

In various embodiments, if the thresholds are exceeded, or if there is no threshold test, server 200 sends the entire query to database 210 for processing, step 610. In this embodiment, database 210 performs the database query portion of the query, step 620 and makes one or more function calls directly to graphing system 220, step 630. In this embodiment, database 210 requests graphing system 220 to perform the social distance computations. As an example, the SQL provided to database 210 may look like:

SELECT listing.title FROM listing WHERE listing.date>"20040101" ORDER BY SOCIAL_DISTANCE(1, listing.user).

In this example, the SOCIAL_DISTANCE function is a call to graphing system 220. As seen, the SOCIAL_DISTANCE function may take two parameters: the identifiers of two users: 1 and listing.user. In return, graphing system 220 returns the social distance between the two people. As an example, if SOCIAL_DISTANCE(1,4)=1, and SOCIAL_DISTANCE(4,10)=1, then SOCIAL_DISTANCE(1,10)=2 because there is a path between 1 and 10 via user 4.

In response, graphing system 220 performs the calculation, step 640, and provides the social distance results to database 210, step 650. Database 210 then combines the social distance results with the database query result, step 660 and provides the combined result to server 200, step 670. In various embodiments, the computation can be embedded into database 210 via a linkable binary, such as a dll or the like. As illustrated in FIG. 4C, server 200 then provides the combined result to the user, step 680.

Figure 5D:
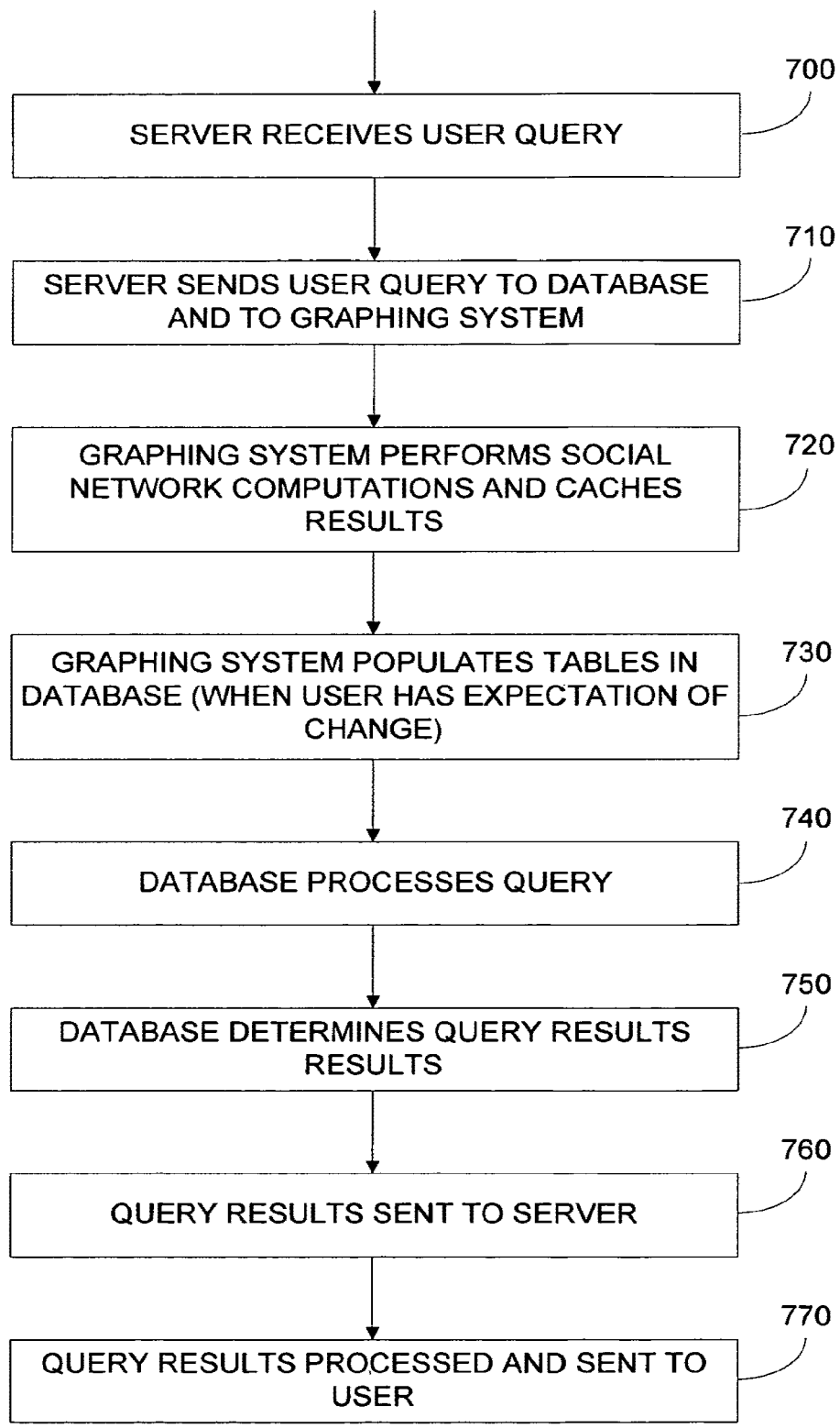

In the embodiment in FIG. 5D, the user sends the query to server 200, step 700. In various embodiments, a thresholding test, such as step 470, may be performed. In some embodiments, if the thresholds are not exceeded, database 210 performs the query by itself, as illustrated in steps 410-440.

In various embodiments, if the thresholds are exceeded, or if there is no threshold test, server 200 sends the query to database 210 and graphing system 220, step 710. In this embodiment, social distance data is represented as one or more temporary tables in database 210. The social distance tables are populated by graphing server 220 in response to the query. In the present embodiment, graphing system 220 performs the social distance computations and caches the results, step 720, and then graphing system 220 populates the social distance tables in database 210 with the cached results, step 730. Database 210 then processes the query, relying upon the social distance tables, step 740, and determines results, step 750. In various embodiments, database 210 performs a JOIN with the temporary social distance tables. The returns are then sent to server 200, step 760, which in turn provides the result to the user, step 770. In various embodiments, the social distance tables are populated by graphing server 220 in response to the query, or have been cached in advance of the query. The caching can be done in anticipation of such a query, for example, when the user logs into a session in the system, the computation can be performed and the results may be cached for that session.

In still other embodiments of the present invention, additional methods for integrating social distance calculations and database queries are contemplated. For example, another method is through use of a "custom storage engine." In such embodiments, by intercepting the way database 210 appears to write to data to storage, graphing system 220 can act as a first class database object like any other relational table. Similar to the above, in various embodiments, a thresholding test, such as step 470, may be performed. In some embodiments, if the thresholds are not exceeded, database 210 performs the query by itself, as illustrated in steps 410-440. In various embodiments, if the thresholds are exceeded, the "custom storage engine" described above is used.

In yet another embodiment, graphing system 220 is directly or indirectly sent the social distance query (e.g. from server 200 or database 210). In response, a string representing users who satisfy the social distance query is sent to database 210. The string is then put in the form of an IN clause. For example, if user 1, user 4, and user 5 were identified, the IN clause to database 210 would be similar to IN(1,4,5). By doing this, the results of the query in database 210 would be restricted to the users identified in the IN clause. In various embodiments, server 200 may send the social distance query to graphing system 220, in response, graphing system 220 returns the users satisfying the social distance calculation, next, server 200 forms an SQL query or the like to database 210 including the IN clause specifying the identified users, as was described above. In another embodiment, server 200 may directly determine results for the social distance query based on cached data in server 200. As above, server 200 may then form the IN portion of an SQL query that is sent to database 210. In various embodiments, a thresholding test, such as step 470, may be performed. In some embodiments, if the thresholds are not exceeded, database 210 performs the query by itself, as illustrated in steps 410-440. In various embodiments, if the thresholds are exceeded, server 200 may form the IN portion of an SQL query and send a formed SQL statement to database 210, as described above.

In still other embodiments of the present invention, multiple thresholds may be applied. Depending upon which thresholds are satisfied, or not satisfied, different ways to generate a response to a query are contemplated. For example, two or more of the above-described methods for computing a response to the user query can be used. For instance: f is the number of direct users coupled to a user, g is the number of affinity groups a user is a member of, X is a threshold of users, Y is a threshold of tribes. Then:

if f<X and g<Y, then the database performs the social distance calculation as illustrated in step 420;

if f>X and g>Y, then the IN clause embodiment is used, as described above;

if f>X and g>Y, then the graphing system performs the social distance calculations as illustrated in step 520; and if f<X and g>Y, then the database receives social distance calculations from the graphing system as illustrated in FIG. 5C and/or 5D.

In other embodiments, an additional number of thresholds may be used to determine how the social distance calculation will be performed and how the data from the database and social distance calculation will be combined. For example, in one embodiment, three or more thresholds may be used. In various embodiments, the threshold factors may include the number of users within one degree from the user, the number of users within two degrees from the user, the number of explicit affinity groups the user belongs to, the number of implied affinity groups the user belongs to, the distance from the user to a specified user, the average distance from the user to users in an affinity group, and the like. In light of this disclosure, one of ordinary skill in the art would now recognize that many other types of threshold factors may be used.

In various embodiments, because social relationship data, group affiliations, interests, and other data of users are available within the graphing system, collaborative filtering operations can easily be performed in real-time. Such operations may include: determining connected tribes to a user—tribes that are similar to a tribe the user is a member of (based upon membership overlap); determining connected people to a user—people that have similar interests as a user, similar tribe membership, or the like; determine suggested tribes to a user—tribes that may be of interest to a user based upon the memberships of a user's friends, co-workers, and the like; determine suggested listings to the user—classified listings, job posts, and the like that may be of interest to the user based upon viewership of the listing by the user's friends, people having similar interests as the user, and the like. More generally, any individual, tribe, implied tribe, or the like, may use decisions made by other persons, tribes, or the like, to help identify classified listings, web-sites, or the like, that are more likely to satisfy a user's needs via the above collaborative filtering. The system described above makes such collaborative data available in real-time.

In one embodiment, collaborative filtering may be implemented in conjunction with search engines such as Yahoo, Google, MSN search, and the like. In such embodiments, clicks on specific links by previous users may be combined with social network collaborative filtering, described above, to determine a priority for search results. For example, a first user is a member of an affinity group such as an "toy airplane affinity group," and a second user is a member of a "fashion affinity group." If the first user searches for the terms "model" and "photography," the search engine may initially identify a number of search result links. Subsequently, based upon selected search result links of other members in the same "toy airplane affinity group," the search engine will promote links about "hobby supplies," "macro photography," "aviation" and the like, for the first user. In contrast, if the second user searches for the same terms "model" and "photography," the search engine may again identify the same number of search result links. However, based upon selected search result links of other members in the "fashion affinity group," the search engine may promote links about "photographic supplies," "fashion models," "weight loss supplements" and the like, for the second user.

As another example, a search engine may prioritize results based upon prior searches performed by users closer than a determined distance away from the user. For example, a college student may search for "airlines" and "hotels." In such embodiments, the search engine may identify potential links to return to the student, then, based upon searches performed by users less than a social distance of, for example, two away from the user, the college student's results may be prioritized. If many of the student's friends are planning trips to Ft. Lauderdale, the search results for "airlines" and "hotels" may prioritize links describing "Spring Break packages to Florida," "Miami nightlife guides," "tanning salons" and the like. In contrast, a retiree searching on the same terms "airlines" and "hotels" may have links such as "term life insurance," "time-share condominiums," "prescription drugs" prioritized, based upon prior searches of close friends of the retiree.

Additionally, in various embodiments, the similarity function used for the collaborative filter may be based upon any combination of overlap between groups, individuals, and/or interest groups of the user. Additionally, different weights may be set for the different relationships for a user. For example, the importance of friends, the importance of the user's interests, the importance of similarly view items, and the like may be different. Further, the weights may be different for different users.

In still other embodiments of the present invention, server 200 may be used to unify two or more social networks into one complete network, termed a "People Web." In various embodiments, a user may establish identities in two separate social networks. In such embodiments, importing data from other social networks or other sites into embodiments of the present invention to determine overlapping identities can be performed with little, if any modification. In such embodiments, server 200, for example, graphing system 220 may be used to unify the identity of the user in the user network and the social map.

In one example, Paul is a member of social network A and a frequent forum poster on site B; Paul is a friend of Sue in social network A (i.e. Sue is a social distance of one away); and Paul and Mark often reply to each-other's posts on the forums on site B (i.e. they are members of an implied tribe, thus Mark is a social distance of 1.5 away). Thus, by linking Paul from network A to Paul on site B, depending on the weights on the links, Mark maybe within Sue's social map (e.g. Mark is a social distance of 2.5 away). In contrast, without linking Paul from network A to Paul on site B, Mark and Sue may have an extremely large social distance. In other embodiments, social distances or other trust-metrics may be computed based upon any of the above-described relationships, such as, amount of communication between the parties, the importance or weight of relationships, the amount of affinity group overlap, the common interests, and the like.

In various embodiments of the present invention, the term social map and social network may also refer to the entire set of first degree relationships of all users. Similarly, the term user social map or user social network, or social map for a user or social network for a user may also refer a group of other users who are connected to the user who are within a specific social distance from the user. In embodiments of the invention, the terms may be interchanged, and depend more upon context of the usage.

Further embodiments can be envisioned to one of ordinary skill in the art after reading this disclosure. In other embodiments, combinations or sub-combinations of the above disclosed invention can be advantageously made. The specification, accordingly, is to be regarded in an illustrative rather than a restrictive sense. It will, however, be evident that various modifications and changes may be made thereunto without departing from the broader spirit and scope of the invention as set forth in the claims.

The invention claimed is:

1. A system for dynamically determining social relationships within a social network, the system comprising:
 a database system including:
  a memory device storing a plurality of social network relationships for a first user; and
  a first processor coupled to the memory device, the first processor operative to process queries related to social network relationships;
 a graphing system including a second processor communicatively coupled to the database system, the second processor operative to compute social distances between users represented by the plurality of social network relationships; and
 a server communicatively coupled to the graphing system and the database system, the server configured to:
  receive a user query requesting information regarding relationships between the first user and other users of the social network, the user query including attributes of users of the social network and a maximum social distance between the first user and other users of the social network;
  analyze the user query to determine if a number of users that are within the maximum social distance exceeds a pre-defined threshold number;
  when the number of users exceeds the pre-defined threshold number, formulate partial queries to divide processing of the partial queries between the database system, the graphing system and the server based at least in part on the analysis of the user query;
  combine results of the partial queries received from the database system and the graphing system; and
  provide a response to the user query based on the combination of results.

2. The system of claim 1, wherein the partial queries include a social distance calculation query and a database query based on the attributes of the users of the social network specified in the user query.

3. The system of claim 2, wherein the server is further configured to divide processing of the user query by:

sending the social distance calculation query to the graphing system; and
 sending the database query to the database system.

4. The system of claim 3, wherein the server is configured to combine the results of the partial queries by performing an intersection operation or a union operation on the results from the social distance calculation query received from the graphing system and results from the database query received from the database system.

5. The system of claim 2, wherein the server is further configured to:
 receive results of the social distance calculation query from the graphing system prior to formulating the database query; and
 send the database query to the database system.

6. The system of claim 5, wherein the server uses the results of the social distance calculation query to limit the database query to users within the maximum social distance specified within the user query.

7. The system of claim 1, wherein the server is further configured to:
 divide processing of the user query by performing a social distance query on cached data accessible on the server and formulating a separate database query to be processed by the database system.

8. The system of claim 1, wherein the server is further configured to:
 divide processing of the user query by formulating a database query including social distance calculations for processing by the database system.

9. The system of claim 8, wherein the database system is further configured to:
 formulate a social distance calculation query for the graphing system in response to receiving the database query from the server.

10. The system of claim 1, wherein the server is further configured to:
 analyze the user query based on multiple social network parameters; and
 formulate one or more queries to divide the processing of the user query based at least in part on the multiple social network parameters.

11. A method for dynamically determining social relationships within a social networking system including a database system, a graphing system, and a server system, the method comprising:
 receiving, on the server system, a user query requesting information regarding relationships between a first user and other users of the social networking system, the user query including attributes of users of the social networking system and a maximum social distance between the first user and other users of the social networking system;
 analyzing, on the server system, the user query to determine if a number of users that are within the maximum social distance exceeds a pre-defined threshold number;
 when the number of users exceeds the pre-defined threshold number, formulating, on the server system, partial queries to divide processing of the partial queries between the database system, the graphing system and the server system based at least in part on the analysis of the user query;
 combining, on the server system, results of the partial queries received from the database system and the graphing system; and providing, from the server system, a response to the user query based on the combination of results.

12. The method of claim 11; wherein the partial queries include a social distance calculation query and a database query based on the attributes of the users of the social networking system specified in the user query.

13. The method of claim 12, further comprising:
sending the social distance calculation query to the graphing system; and
sending the database query to the database system.

14. The method of claim 13, further comprising:
combining the results of the partial queries by performing an intersection operation or a union operation on the results from the social distance calculation query received from the graphing system and results from the database query received from the database system.

15. The method of claim 12, further comprising:
receiving results of the social distance calculation query from the graphing system prior to formulating the database query; and
sending the database query to the database system.

16. The method of claim 15, further comprising analyzing the results of the social distance calculation query to limit the database query to users within the maximum social distance specified within the user query.

17. A non-transitory computer-readable storage medium comprising instructions that, when executed within a social networking system including a database system, a graphing system, and a server system, cause the social network system to perform operations comprising:
receiving, on the server system, a user query requesting information regarding relationships between a first user and other users of the social networking system, the user query including attributes of users of the social networking system and a maximum social distance between the first user and other users of the social networking system;
analyzing, on the server system, the user query to determine if a number of users that are within the maximum social distance exceeds a pre-defined threshold number;
when the number of users exceeds the pre-defined threshold number, formulating, on the server system, partial queries to divide processing of the partial queries between the database system, the graphing system and the server system based at least in part on the analysis of the user query;
combining, on the server system, results of the partial queries received from the database system and the graphing system; and
providing, from the server system, a response to the user query based on the combination of results.

18. The non-transitory computer-readable storage medium of claim 17, wherein the partial queries include a database query including social distance calculations for processing by the database system.

19. The non-transitory computer-readable storage medium of claim 18, wherein the partial queries include a social distance calculation query for the graphing system in response to receiving the database query results from the server system.

20. The non-transitory computer-readable storage medium of claim 17, further including instructions that cause the server system to:
analyze the user query based on multiple social network parameters; and
formulate one or more queries to divide the processing of the user query based at least in part on the multiple social network parameters.

\* \* \* \* \*